US011696209B2

(12) United States Patent
Sparks et al.

(10) Patent No.: US 11,696,209 B2
(45) Date of Patent: *Jul. 4, 2023

(54) GEOGRAPHIC ROUTING BASED ON 5G NETWORK SLICE AVAILABILITY

(71) Applicant: DISH Wireless L.L.C, Littleton, CO (US)

(72) Inventors: Craig Sparks, Highlands Ranch, CO (US); Gerald Callejo, Lakewood, CO (US)

(73) Assignee: DISH Wireless L.L.C, Littleton, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/050,718

(22) Filed: Oct. 28, 2022

(65) Prior Publication Data

US 2023/0075349 A1 Mar. 9, 2023

Related U.S. Application Data

(63) Continuation of application No. 17/093,241, filed on Nov. 9, 2020, now Pat. No. 11,516,724.

(51) Int. Cl.
*H04W 40/20* (2009.01)
*H04W 28/08* (2023.01)
(Continued)

(52) U.S. Cl.
CPC ......... *H04W 40/20* (2013.01); *H04L 41/5067* (2013.01); *H04W 28/0263* (2013.01); *H04W 28/0967* (2020.05); *H04W 28/24* (2013.01)

(58) Field of Classification Search
CPC ............ H04W 40/20; H04W 28/0263; H04W 28/0967; H04W 28/24; H04W 4/40;
(Continued)

(56) References Cited

U.S. PATENT DOCUMENTS

2014/0257695 A1\* 9/2014 Annapureddy .... G01C 21/3461
701/537
2017/0171042 A1\* 6/2017 Tofighbakhsh ..... H04L 65/1016
(Continued)

OTHER PUBLICATIONS

International Search Report and Written Opinion for PCT/US2021/058383 dated Feb. 7, 2022, all pages.
(Continued)

*Primary Examiner* — Omer S Mian
(74) *Attorney, Agent, or Firm* — Kilpatrick Townsend & Stockton

(57) ABSTRACT

Various arrangements for performing navigation based on characteristics of a cellular network are provided. A quality of experience (QoE) level required for a wireless service to be performed for a networked device may be determined. A current location and a destination for a vehicle may be determined. A wireless network coverage area map may be accessed that maps network performance characteristics for the cellular network across a geographic region. A navigation route from the current location to the destination based on the wireless network coverage area map and the determined QoE may be determined. The determined navigational route may be output to a navigation system.

20 Claims, 6 Drawing Sheets

(51) Int. Cl.
*H04W 28/02* (2009.01)
*H04W 28/24* (2009.01)
*H04L 41/5067* (2022.01)

(58) Field of Classification Search
CPC ......... H04W 28/0226; H04W 28/0236; H04W 28/0268; H04W 4/029; H04L 41/145; H04L 41/5022; H04L 41/5067; H04L 43/0829; H04L 43/0852; H04L 43/0888; H04L 43/0894; H04L 45/302; H04L 47/78; H04L 67/52
See application file for complete search history.

(56) References Cited

U.S. PATENT DOCUMENTS

| | | | |
|---|---|---|---|
| 2021/0114616 A1 | 4/2021 | Altman | |
| 2021/0184943 A1* | 6/2021 | Jia | H04W 28/0226 |
| 2021/0211942 A1* | 7/2021 | Guo | H04L 43/08 |

OTHER PUBLICATIONS

"3rd Generation Partnership Project; Technical Specification Group Services and System Aspects; Study on enhancement of 3GPP Support for 5G V2X Services (Release 16)", 3GPP Standard; Technical Report; 3GPP TR 22.886, 3rd Generation Partnership Project (3GPP), Mobile Competence Centre: 650, Routes Des Lucioles; F-06921 Sophia-Antipolis Cedex; France, vol. SA WGI, No. V16.1.0, Sep. 21, 2018, pp. 1-76, XP051487103, [retrieved on Sep. 21, 2018] p. 49-p. 51, p. 62.

* cited by examiner

GEOGRAPHIC ROUTING BASED ON 5G NETWORK SLICE AVAILABILITY

CROSS-REFERENCE TO RELATED APPLICATION

This application is a continuation of U.S. patent application Ser. No. 17/093,241 filed Nov. 9, 2020, entitled "GEOGRAPHIC ROUTING BASED ON 5G NETWORK SLICE AVAILABILITY," the entire disclosure of which is hereby incorporated by reference, for all purposes, as if fully set forth herein.

BACKGROUND

Various wireless services can require significantly different amounts and types of network resources. For example, a piece of equipment being able to send telemetry data may require little network bandwidth and may be able to tolerate a relatively large amount of network latency. In contrast, a live video conference session may require a significant amount of network bandwidth and may be able to tolerate a relatively low amount of network latency. Historically, in an emergency situation, such as an ambulance crew requiring enough bandwidth to effectively use a piece of equipment, the crew may be instructed to drive to the nearest highway simply because wireless networks tend to have excellent coverage and performance near highways. Such an instruction to proceed to a local highway may not be the most efficient way to obtain a sufficient quality of service commensurate with their dynamic needs, especially in the case of an emergency.

SUMMARY

Various embodiments are described related to a method for navigation performed based on characteristics of a cellular network. In some embodiments, a method for navigation performed based on characteristics of a cellular network is described. The method may comprise determining, by an on-board management system, a quality of experience (QoE) level required for a wireless service to be performed for a networked device. The method may comprise determining, by the on-board management system, a current location and a destination. The method may comprise receiving, by the on-board management system, a wireless network route priority. The method may comprise accessing, by the on-board management system, a wireless network slice coverage map. The wireless network slice coverage map may map a plurality of network performance characteristics for the cellular network across a geographic region. The method may comprise determining, by the on-board management system, a route from the current location to the destination based on the wireless network slice coverage map, the determined QoE, and the wireless network route priority. The method may comprise outputting, by the on-board management system, the determined route to a navigation system.

Embodiments of such a method may include one or more of the following features: the plurality of network performance characteristics may comprise: a packet loss rate; latency; and bandwidth. The wireless network slice coverage map may map wireless network slices which the on-board management system may be authorized to access. The wireless network route priority may be selected from the group consisting of: an expense priority; a least-time priority; and a greatest performance priority. The method may further comprise assigning a first weight to the expense priority, a second weight to the least-time priority; and a third score to the greatest performance priority. The method may further comprise: determining, by the on-board management system, the destination based on the wireless service to be performed for a networked device. Determining the QoE level required may be based on the QoE level required for a plurality of networked devices over a period of time. The wireless network slice coverage map may map the plurality of network performance characteristics across the geographic region for multiple cellular networks. The on-board management system may be integrated as part of a public safety vehicle and the networked device may be a telemedicine device for providing medical care to a patient. The cellular network may be a 5G New Radio (NR) cellular network.

In some embodiments, a system for navigation performed based on characteristics of a cellular network is described. The system may comprise an on-board management system, installed on a vehicle. The on-board management system may comprise a global navigation satellite system (GNSS) component. The on-board management system may comprise a user input component. The on-board management system may comprise a cellular network interface. The on-board management system may comprise a processing system, comprising one or more processors, where the processing system may be configured to determine a quality of experience (QoE) level required for a wireless service to be performed for a networked device. The processing system may be configured to determine a current location using data from the GNSS component and a destination. The processing system may be configured to receive a wireless network route priority via the user input component. The processing system may be configured to access a wireless network slice coverage map. The wireless network slice coverage map may map a plurality of network performance characteristics for the cellular network across a geographic region. The processing system may be configured to determine a route from the current location to the destination based on the wireless network slice coverage map, the determined QoE, and the wireless network route priority. The processing system may be configured to output the determined route to a navigation system.

Embodiments of such a method may include one or more of the following features: the plurality of network performance characteristics may comprise: a packet loss rate; latency; and bandwidth. The wireless network slice coverage map may map wireless network slices which the on-board management system may be authorized to access. The wireless network route priority may be selected from the group consisting of: an expense priority; a least-time priority; and a greatest performance priority. The processing system may be further configured to assign a first weight to the expense priority, a second weight to the least-time priority; and a third score to the greatest performance priority. The processing system may be further configured to determine the destination based on the wireless service to be performed for a networked device. The processing system being configured to determine the QoE level required may be based on the QoE level required for a plurality of networked devices over a period of time. The system may further comprise a cloud-based server system that may communicate with the on-board management system. The system may further comprise a public safety vehicle. The on-board management system may be integrated as part of the public safety vehicle and the networked device may be a telemedicine device for providing medical care to a patient. The cellular network may be a 5G New Radio (NR) cellular network.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In certain circumstances, maintaining a particular Quality of Experience (QoE) may be important while a system, which may be on a vehicle, is in motion. In order for a particular networked device to obtain the QoE level required in order to function acceptably, a route may be taken. This route may not be the fastest route for the vehicle to travel from its starting point to its destination, but instead this route may allow for a QoE level for one or more networked devices to function at an acceptable level.

For example, an ambulance may have one or multiple networked devices on board. For example, a video conference system may be on-board to allow a doctor to immediately review and participate in potentially life-saving decisions being made by paramedics on board. Further, various pieces of medical equipment, such as blood pressure monitors, blood oximeters, electrocardiogram devices, etc. may be networked such that telemetry data can be relayed to a hospital to which the ambulance is travelling to. For example, the doctor participating in the remote video conference session may be viewing the telemetry data while participating in the video conference session. More advanced participation by a remote party may also be possible.

In the example of an ambulance, while travelling to the hospital as quickly as possible may be beneficial, it may be at least temporarily more important to maintain a particular QoE such that the networked devices aboard the ambulance can function effectively. For instance, if a doctor was providing life-saving advice on how to treat a patient, it could be catastrophic if the video conference session cuts out even briefly. In such a scenario, a longer travel time to the hospital may be tolerated in exchange for the route being optimized to allow for greater QoE of the ambulance's networked devices.

Embodiments detailed herein are focused on optimizing a route to a destination and/or selecting a destination in order to ensure that a QoE level experienced is adequate for one or more networked devices to be used or that are being used. The route can be optimized for various factors, including travel time, cost, and/or performance. Each of these factors can be weighed against each other either by the system or by a user. Further detail regarding such embodiments is provided in relation to the figures.

Throughout this document, QoE is referred to in relation to a cellular network. QoE is explicitly directed to the ability of the end user device to function acceptably for end users. For different end user devices, the QoE service levels needed and monitored QoE metrics may vary. For instance, for a voice over IP (VoIP) service, latency and packet loss may greatly affect ability to conduct a call compared to bandwidth. In order to achieve a QoE level, various Quality of Service (QoS) metrics may be monitored, including packet loss, latency, bandwidth, average throughput, etc.

Figure 1:
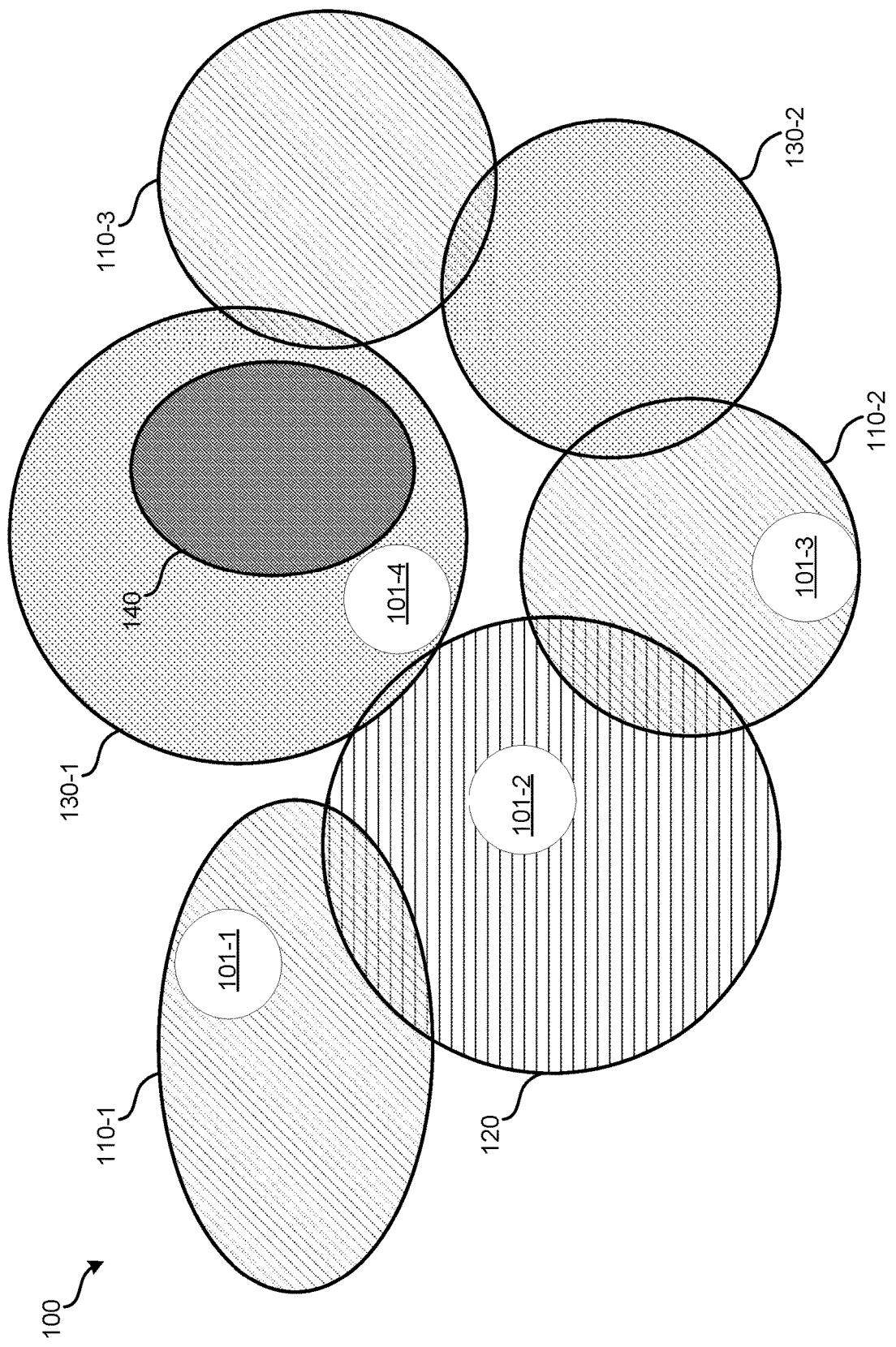
FIG. 1 illustrates an embodiment of a map of coverage areas of network slices of varying capabilities geographically separated over a region.

FIG. 1 illustrates an embodiment of a map 100 of coverage areas of network slices over a geographic region. A cellular network "slice" can refer to a portion of a wireless cellular network that functions logically independent from other portions of the cellular network and that is reserved for user equipment (UE) of one or more particular users or entities. For example, on a 5G New Radio (NR) cellular network, a network slice may be reserved for the UE of one or more particular users or users associated with particular entities. A network slice may be configured to meet particular requirements needed by the UE of particular users, entities, and/or applications executed on such UE. Map 100 illustrates the geographic region in which particular cellular networks slices are available. Different network slices may have different performance characteristics, including different amounts of average latency, average packet loss; average throughput; etc. Therefore, if UE is present within a geographic region where a network slice is available and has access, the UE can most likely experience a particular minimum level of network performance when operating on that network slice. A network slice that is reserved for particular users or entities may not be available everywhere due to hardware and network limitations of the cellular network. For example, while a user may have permission to use a particular network slice of a cellular network, the necessary network hardware or core-network network bandwidth to realize the performance of the network slice may not be installed in a given geographic region and thus, the UE may not be able to access the network slice, may experience a degraded QoE, or may be required to utilize a different cellular network slice.

In some embodiments, rather than a map of network slices of a geographic region, map 100 may indicate cellular network capabilities of a geographic region. For example, the UE of a user or entity may not have a particular reserved network slice on a cellular network, but rather may operate as part of a general pool of UE that can utilize a cellular network. For some types of cellular networks (e.g., 3G), it may not be possible to define dedicated network slices. For embodiments where network slices are not used or not available, map 100 may indicate measured levels of performance, such as divided into QoE levels typically experienced in given geographic locations.

Map 100 illustrates the coverage of various network slices available across a geographic region. A first network slice may be available in regions 110-1, 110-2, and 130-2. A second network slice may be available in region 120. A third network slice may be available in regions 130-1 and 130-2. A fourth network slice may be available in region 140. Dead spots 101 (which includes dead spots 101-1, 101-2, 101-3, and 101-4) can represent locations where cellular network service is not available or is degraded.

Different network slices may be mapped with different QoE assignments. Based on the performance characteristics of a network slice, a QoE assignment may be set for each network slice based upon the minimum or average performance characteristics of the network slice. In some embodiments, a QoE assignment may be defined based on whether the network slice is appropriate for handling particular applications. For instance, a QoE assignment may be: "video conferencing, telemetry, and VoIP" or a QoE assignment may indicate a total average bandwidth, latency, etc. that is expected to be realized.

Various time varying overlap can be expected to dynamically exist between coverage areas of network slices. For instance, network slice region 110-1 overlaps network slice region 120 at a given point in time. Therefore, when a networked device is travelling between network slice region 110-1 and network slice region 120, the transition can be seamless and the networked device may not lose network connectivity.

For the purposes of the example of FIG. 1, the network slices from highest to lowest QoE levels are: the fourth network slice corresponding to region 140; the third network slice corresponding to regions 130; the first network slice corresponding to regions 110; and the second network slice corresponding to region 120. Further, by way of example, the fourth network slice may a QoE level that allows for: high definition video conferencing, telemetry reporting data; VoIP; and remote control of one or more devices, such as a robotic arm. The third network slice may be a QoE level that allows for: standard definition video conferencing, telemetry reporting data; and VoIP. The first network slice may be a QoE level that allows for: telemetry reporting data and VoIP. Finally, continuing with the example, the second network slice may be a QoE level that allows for telemetry reporting data. These examples demonstrate how different network slices or different QoE levels appropriate for different end-user applications, can be realized in different locations on a particular cellular network.

In some embodiments, map 100 can include network slices or QoE levels for only a particular cellular network. In other embodiments, map 100 can include network slices or QoE levels for multiple cellular networks. For instance, an end user or entity may have the ability to access multiple cellular networks via a single UE. The network slices or QoE levels available across the multiple cellular network may be overlaid as part of a single map. The UE of the end user or entity can be switched between different cellular networks as needed to connect with the most appropriate network slice or achieve the most appropriate QoE level.

Figure 2:
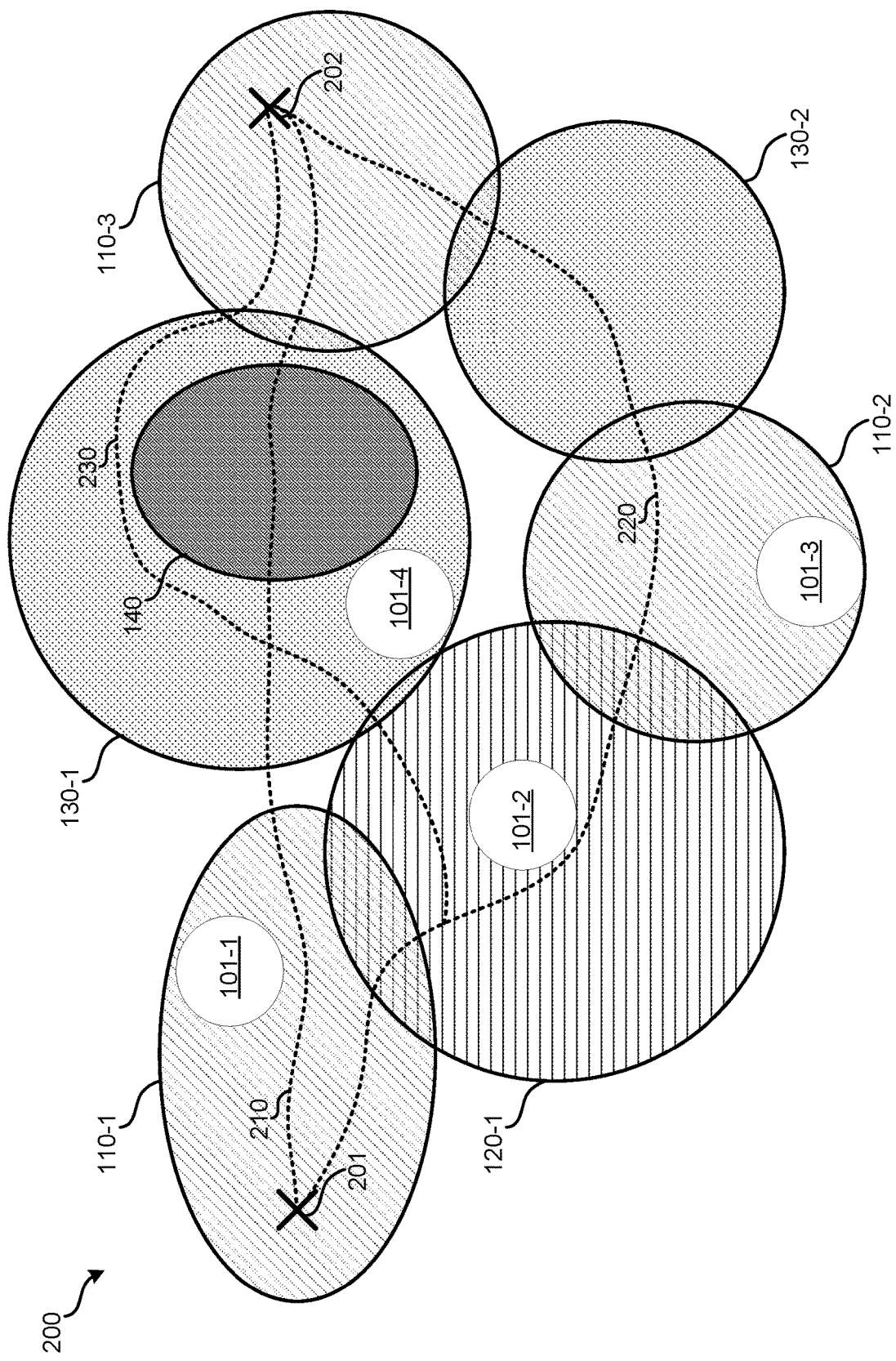
FIG. 2 illustrates an example of path routing performed based on characteristics of the map of coverage areas of network slices over a geographic region.

FIG. 2 illustrates an embodiment of map 200 that presents path routing performed based on characteristics of the map of coverage areas of network slices over a geographic region. Map 200 represents map 100 with multiple paths overlaid. In addition to the coverage areas of various network slices, a travel route may need to take into account the mode of transit (e.g., pedestrian, bicycle, vehicle, public transit, emergency vehicle, etc.) and what pathways are available to accommodate the mode of transit, such as roads for vehicles, roads and bike paths for bicycles, roads and emergency accesses for emergency vehicles, sidewalks for pedestrians, etc.

Routes 210, 220, and 230 may be determined based on the coverage areas of network slices of map 100, the mode of transit, the available pathways, and an indication of cellular network priority. For the examples of routes 210, 220, and 230, an emergency vehicle, such as an ambulance needs to travel by road from current location 201 to destination 202, which may be a hospital. Route 210 is determined to prioritize "least travel time." Therefore, route 210 travels through a region where no coverage by a network slice of the wireless network is available. Route 210 may be advisable if a period of no connectivity or reduced connectivity with the cellular network can be tolerated.

In other situations, one or more end user devices or applications executed on such end user devices, such as in an ambulance or some other form of public safety vehicle, may not be able to tolerate a period of no connectivity. Route 220 is indicative of a longer driving route, but that based on map 100 will result in cellular network access remaining available consistently throughout travel from current location 201 to destination 202. As another option, a route may be selected to ensure a particular QoE, to the extent possible, is realized. Such embodiments can involve avoiding network slices that do not have sufficient resources reserved to allow for the desired QoE level to be met.

In still other situations, one or more end user devices or applications executed on such end user devices may be desired to be operated at a lowest possible cost while maintaining connectivity. Cellular network access via the slice of region 130-1 may be less expensive than the slice of geographic region 110-2. Further, the network slice of region 140, while providing a high QoE that may be expensive to use, therefore path 230 remains within region 130-1, but avoids region 140.

In the example of map 200, the paths are based on a user specifying or a preference being set as to whether to exclusively prioritize travel time, connectivity, or cost. However, in some embodiments, each of these factors may be weighed relative to each other. For instance, the importance of travel time or distance may be given a weight of 0.6, connectivity 0.3, and cost 0.1. In such an example, cost would be considered in determining the route, but would affect the selected route significantly less than the travel time or distance.

Figure 3:
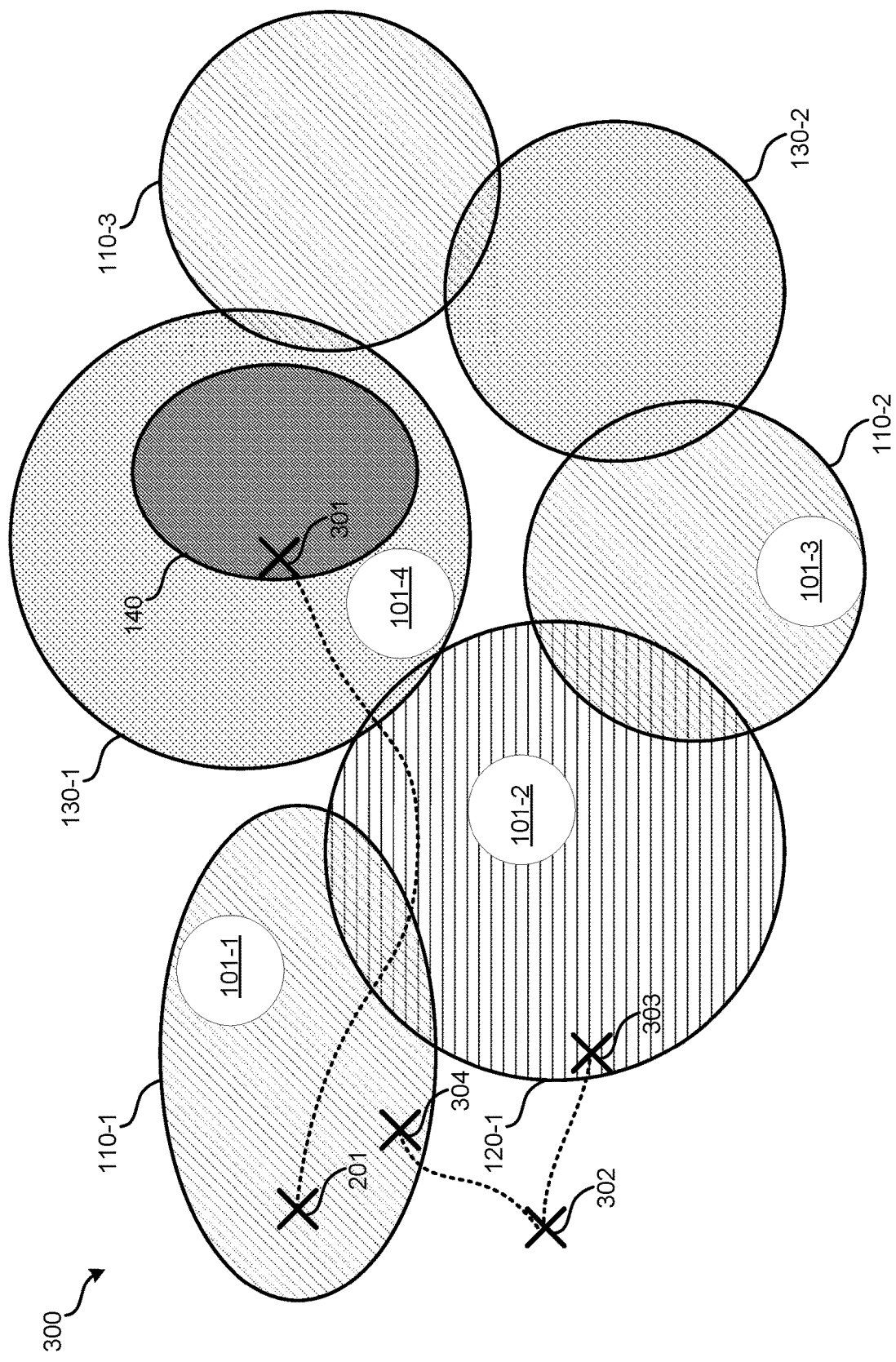
FIG. 3 illustrates an example of path routing performed to an indeterminate destination based on characteristics of the map of coverage areas of network slices over a geographic region.

FIG. 3 illustrates an example of path routing performed to an indeterminate destination based on characteristics of the map of coverage areas of network slices over a geographic region. In some situations, no particular destination may be needed, but rather a location where at least a particular QoE level can be realized. As an example, consider an ambulance needing to get to a location where a certain telemedicine application can be executed. It may be more important to get to a location where the application can be executed over the cellular network with a sufficient QoE rather than getting to a particular destination.

In such embodiments, a priority may be specified, such as a desired QoE level or cost. A destination may be selected that is within a geographic region covered by an appropriate network slice. Further, from the current location to the indeterminate destination, other priorities may attempt to be satisfied, such as continuity of network coverage, cost, or travel time.

In a first example, an end user is at current location 201. The end user indicates that a particular application is to be executed that requires a very high QoE level. Destination 301 may be determined as a most convenient location to travel to for which the desired QoE level can be met by the cellular network. In a second example, an end user such as an ambulance, is outside of network coverage at current location 302. A paramedic indicates to an on-board system that cellular network coverage is needed with a QoE level sufficient for telemetry data to be reported from a telemedicine application. The on-board system selects destination 303 within region 120-1 and provides navigation instructions. Region 120-1 is mapped to a network slice that provides a sufficient QoE level to support the telemedicine application. Alternatively, the on-board system may select location 304 within region 110-1 if a higher QoE level is needed, such as to support video conferencing. In some embodiments, indeterminate destinations, such as destination 303, are not set to be right on the edge of a network slice, such as the network slice corresponding to region 120-1. Rather, a predefined buffer distance for destination 303 from an edge of the network edge within region 120-1 is used to ensure that network connectivity remains strong at the determined destination.

Figure 4:
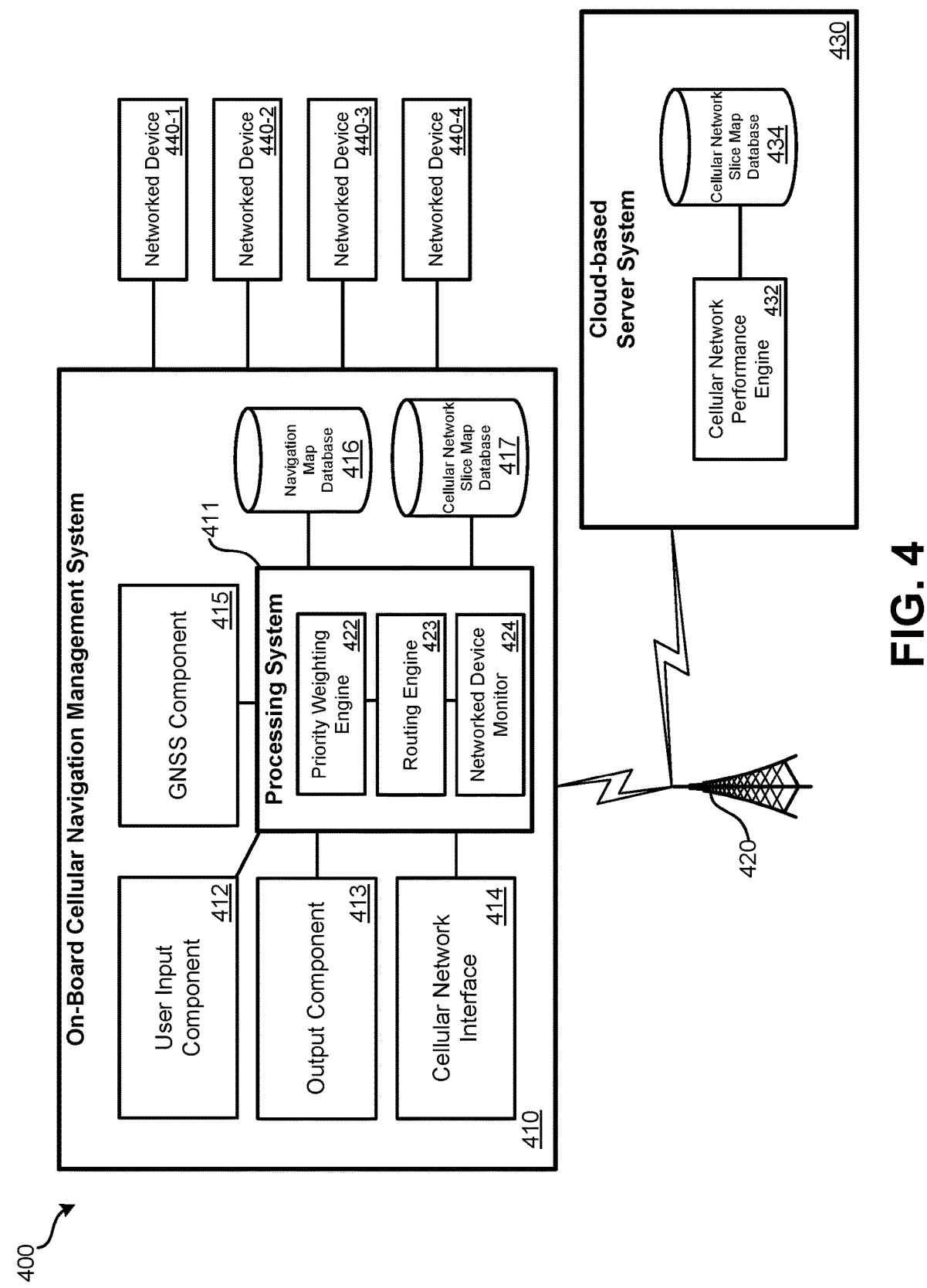
FIG. 4 illustrates an embodiment of a block diagram of a system for mapping and routing based on coverage areas of network slices over a geographic region.

The navigational paths on maps 200 and 300 may be determined using an on-board cellular navigation management system. FIG. 4 illustrates an embodiment of a block diagram of a cellular network slice-based navigation system 400 ("system 400") for mapping and routing based on coverage areas of network slices over a geographic region. System 400 can include: on-board cellular navigation management system 410 ("system 410"); cellular network 420; cloud-based server system 430; and networked devices 440 (which can include networked devices 440-1, 440-2, 440-3, and 440-4).

System 410 may be installed on a vehicle, such as an emergency vehicle, or any other vehicle that may need to be navigated based on prioritizing cellular network access. System 410 may also be incorporated in a mobile device, such as a smart phone. For instance, system 410 may be implemented as an application that can be downloaded and installed on a smart phone. System 410 may be implemented as a dedicated device that can be physically carried by a user or installed on a vehicle, such as a bicycle. System 410 may be incorporated as part of other forms of computerized devices, such as a laptop computer.

System 410 can include: processing system 411; user input component 412; output component 413; cellular network interface 414; global navigation satellite system (GNSS) component 415; navigation map database 416; and cellular network slice map database 417. In some embodiments, system 410 serves as a cellular network access point (AP) for one or more of networked devices 440. In other embodiments, system 410 communicates with a separate AP used by one or more of networked devices 440. Additionally or alternatively, one or more of networked devices 440 may directly communicate with the cellular network but may provide status information and/or receive instructions from system 410.

GNSS component 415 may determine an absolute location of system 410. GNSS component 415 may include a Global Positioning System (GPS) sensor, Galileo, GLObal Navigation Satellite System (GLONASS) sensor, and/or some other form of location determining sensor. User input component 412 may allow a user to input various pieces of information, such as a desired destination, a priority, weightings for priorities, in indication of whether an indeterminate destination is desired, etc. User input component 412 can include a touchscreen, keyboard, pointing device, or some other form of input device that allows for user input. Output component 413 can include various forms of output devices that allow route navigation information to be provided to a user. Output component 413 includes a touchscreen, a non-touch display screen, and/or speaker. In some embodiments, a touchscreen or display screen may present a network slice map similar to map 100 or a map similar to map 200 that indicates a navigational route superimposed on coverage regions of network slices. In some embodiments, navigational routes may be shown superimposed on a navigation map showing roads without visual indications of network slices. Directions that the user should follow may be output via spoken commands using one or more speakers. In some embodiments, output component 413 may be in communication with an autonomous or semiautonomous driving system that can directly control a vehicle and cause it to follow a navigational route determined by system 410.

System 410 can receive from either a user or directly from networked devices 440, an indication of network-reliant services that are needing to be performed using networked devices 440. For example, in some situations a networked device, such as networked device 440-1, may be used to perform videoconferencing. However, networked device 440-1, may not need to be used at all times. Therefore, a user may indicate when networked device 440-1 needs to be used for, networked device 440-1 may output in indication of when it is in use. If system 410 is used by networked device 440-1 as an access point, system 410 can detect the use of networked device 440-1.

Cellular network interface 414 may be used by system 410 to communicate with a cellular network and/or function as an access point for one or more of networked devices 440. In some embodiments, cellular network interface 414 may be capable of communicating with multiple different cellular networks, possibly concurrently. Cellular network interface 414 may be configured to communicate with a 5G NR cellular network. Other forms of cellular networks are also possible, such as GSM, 3G, and 4G LTE networks.

Navigation map database 416 can store a map of permissible routes, including roads, bicycle paths, mass transit, emergency access points, etc. for a geographic area. Navigation map database 416 may be updated periodically, such as by cloud based server system 430. Cellular network slice map database 417 may store indications of QoE levels provided by various network slices and the geographic regions covered by such network slices. In some embodiments, databases 416 and 417 are combined into a single database. While databases 416 and 417 are illustrated as part of system 410, it should be understood that such data may be stored remotely, such as by cloud based server system 430. For example, cloud-based server system 430 may store navigational maps and cellular network slice maps for a much wider geographic region, with databases 416 and 417 being used to store data for a more limited geographic region corresponding to where system 410 is located. Further, in some embodiments, a central server may store some or all of databases 416 and 417, and copies of such databases or portions of such databases may be hosted by edge servers that can communicate with system 410 with lower latency and/or higher bandwidth.

Networked devices 440 can represent any form of devices local to system 410 that require cellular network access. For example, for an ambulance, networked devices 440 can include telemedicine related devices. For example, telemetry data relating to a patient's pulse, blood pressure, blood oxygen level, etc. may be collected and transmitted via the cellular network using one or more of networked devices 440, another networked device may be used for videoconferencing; and yet another networked device may be used for a doctor to operate a piece of equipment remotely (e.g., a robotic arm). The number of networked devices may vary by embodiment, such as from one to a hundred.

Cellular network 420 may be used for communication between system 410 and cloud based server system 430. In some embodiments, system 410 may use multiple cellular networks to communicate, possibly concurrently. Networked devices 440 may communicate via cellular network 420 via system 410, via a separate AP, or directly. Communication with cloud based server system 430 may involve cellular network 420 accessing cloud based server system 430 via the Internet or some other public or private network.

In order to create a cellular network slice map, data may need to be collected from a variety of pieces of UE scattered across a geographic area. By measuring the performance of a cellular network when communicating with the pieces of UE, a map of QoE levels or coverage areas of network slices can be created. Variations in weather, obstacles, and network conditions may require that the cellular network slice map be intermittent and periodically updated. For instance, the performance observed by various pieces of UE (such as system 410 and/or networked devices 440) in particular geographic locations may be used to update a cellular network slice map. Cellular network performance engine 432 may gather network performance data from many instances of UE that are scattered geographically. Data gathered on network performance by cellular network performance engine 432 from various pieces of UE or directly observed by cellular network 420 can be used to create and/or update a cellular network slice map, which may be stored to cellular network slice map database 434 and may be distributed to various pieces of UE, such as system 410 for storage in navigation map database 416.

System 410 may incorporate computerized components. For instance, one or more non-transitory processor readable mediums, memories, storage devices, communication buses may be present. Processing system 411 may include one or more special-purpose or general-purpose processors. Such special-purpose processors may include processors that are specifically designed to perform the functions detailed herein. Such special-purpose processors may be application-specific integrated circuit (ASICs) or field-programmable gate array (FPGAs) which are general-purpose components that are physically and electrically configured to perform the functions detailed herein. Such general-purpose processors may execute special-purpose software that is stored using one or more non-transitory processor-readable mediums, such as random-access memory (RAM), flash memory, a hard disk drive (HDD), or a solid-state drive (SSD). Processing system 411 can perform the functions of multiple components, including priority weighting engine 422; routing engine 423; and networked device monitor 424. These components can be implemented as software.

Priority weighting engine 422 may, based on a particular specified priority or the weighting of multiple priorities, provide input to routing engine 423 for determining a route. In some embodiments, priority weighting engine 422 may access networked device monitor 424 to determine the types of networked devices being used and/or the QoE levels needed for such networked devices. For example, the QoE needed for a particular networked device, may demand a high QoE while another particular networked device may only need a lower QoE, but may be intolerant of a loss of connectivity. Therefore, the particular networked devices of networked devices 440 being used (or planning on being used) during travel may be used to define the priorities used by priority weighting engine 422.

Networked device monitor 424 may receive input from a user indicating which networked devices are being used or are planning on being used during transit. In some embodiments, networked devices 440 may report to processing system 411 whether they are in use. Networked device monitor 424 may aggregate the various QoE levels needed by multiple networked devices to determine what level of aggregate cellular network services are required. For instance, two networked devices that use cellular network interface 414 to communicate may in aggregate, require a greater amount of bandwidth than a particular network slice can provide.

Routing engine 423 may determine the navigational path that system 410 (and any vehicle in which system 410 is incorporated or an end user possessing system 410) should follow from a current location to a particular destination or an indeterminate destination. Routing engine may use data from: cellular network slice map database 417; navigation map database 416; priority weighting engine 422; networked device monitor 424; and/or user input component 412 to determine a particular navigational route that should be taken. When the navigational route is determined, multiple outputs may be provided to output component 413. Directions for the navigational route may be output. Additionally or alternatively, indications of how well the specified priorities can be followed may be output. For instance, a synthesized speech statement such as "During travel, it is expected that a sufficient QoE for all presently used networked devices will be maintained," or "During travel, it is expected that a 3 minute period of time will exist during which a sufficient QoE will not be available for all presently used networked devices. This period of time is due to optimizing for a shorter duration of travel time."

While the functionality of processing system 411 may be incorporated as part of system 410 in some embodiments, such functionality may be performed by remote system, such as cloud based server system 430. If incorporated as part of cloud based server system 430, some level of connectivity with the cloud based server system 430 may be needed in order to perform navigation based at least in part on the availability of cellular network slices. Therefore, it may be preferable to have such functionality incorporated as part of system 410.

Figure 5:
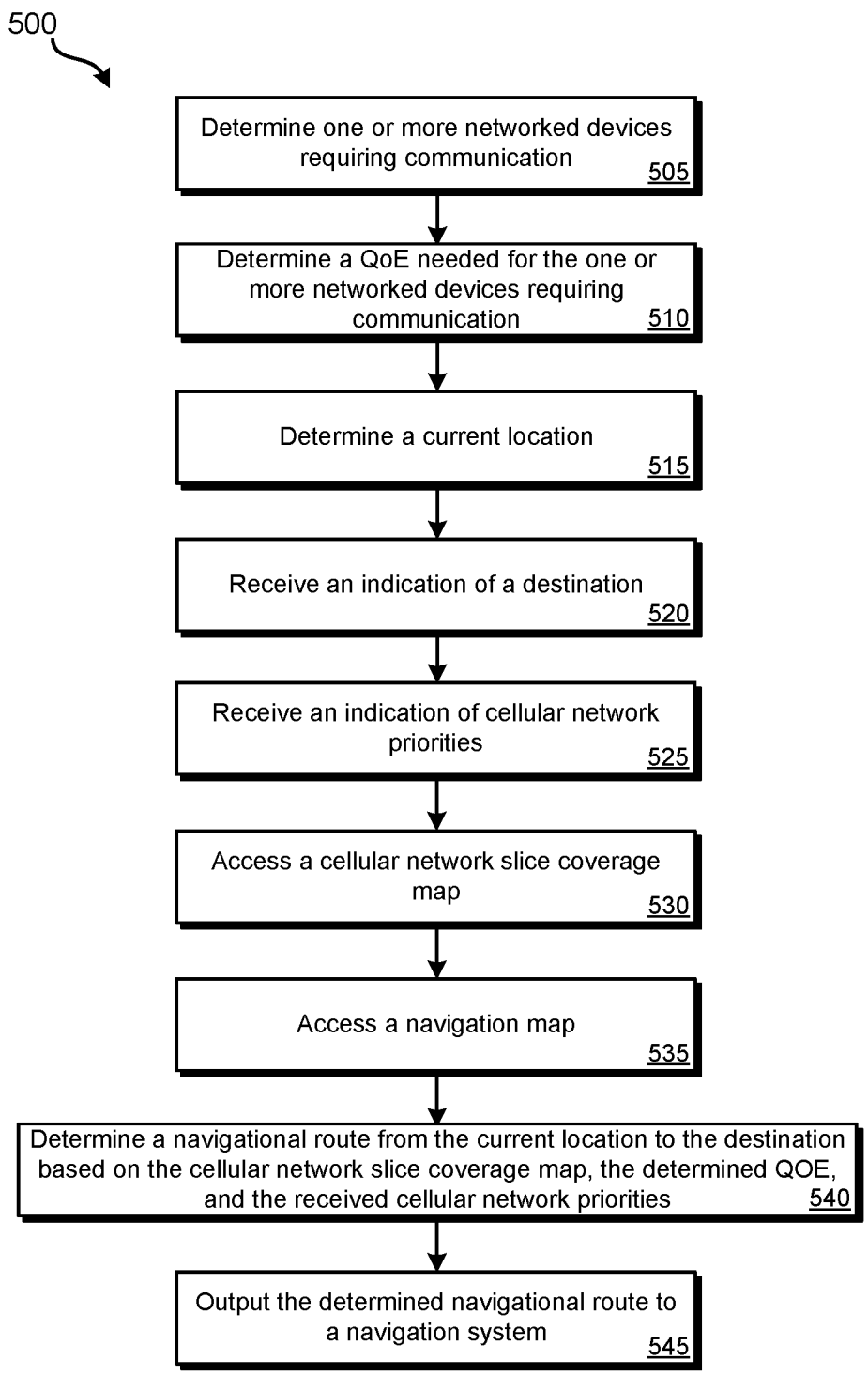
FIG. 5 illustrates an embodiment of a method for navigation performed based on characteristics of the map of coverage areas of network slices over a geographic region.

Various methods may be performed based on the systems, devices, and maps of FIGS. 1-4. FIG. 5 illustrates an embodiment of a method 500 for navigation performed based on characteristics of mapped coverage areas of network slices over a geographic region. Method 500 may be performed using system 400 of FIG. 4 or an alternate embodiment thereof. At block 505, initial determination of one or more networked devices that require communication via a cellular network may be determined. The determination may be made by an on-board system, such as system 410. The determination may involve input from a user indicating networked devices that are required to be used during travel. In some embodiments, a predefined list of networked devices is specified that are assumed to be needed during travel. Additionally or alternatively, networked devices that are currently being used or are expected to be used, may transmit data to the on-board system indicating such use. In some embodiments, a further indication of particular QoS parameters needed or a QoE level needed to be realized may be predefined, specified by the user, or indicated by the networked device itself.

At block 510, a QoE level needed for the one or more determined networked devices requiring communication may be determined. This can involve aggregating expected average data throughput rates, needed latency, etc. in order to determine the particular needs of the networked devices in aggregate. Block 510 may be performed by the on-board system or may be determined by a remote server system that is in communication with the on-board system. If only one particular networked device is being used, block 510 may not be needed.

At block 515, a current location of the on-board system may be determined. Such a determination may be made based on user input, such as an address or an absolute location determination being made using a GNSS sensor of the on-board system, such as a GPS sensor. At block 520, an indication of the destination may be received by a user inputting an address or a predefined destination being accessed by the on-board system. For example, when a paramedic in an ambulance initiates navigation, the destination may be preset to the nearest or a particular hospital.

At block 525, an indication of a cellular network priority may be received or accessed by the on-board system. Cellular network priority may indicate whether travel time, overall QoE level, continuity of cellular network coverage, or expense of access to the cellular network (or multiple cellular networks) is preferred to be optimized for the navigation route. In some embodiments, a weighting of multiple cellular network priorities may be provided by the user or predefined.

At block 530, a cellular network slice coverage map may be accessed. The map may contain similar information to map 100 of FIG. 1. That is, the map may define geographic coverage areas of particular network slices of one or more cellular networks. The particular QoS metrics or QoE level expected to be experienced for a network slice (or average network performance characteristics) may be mapped to a particular geographic region. Since a network slice involves particular network resources being reserved for a particular end user or entity, the QoE experienced by the on-board system can be expected to match the QoE level set in an agreement for access to the network slice. The particular geographic region may have previously been determined based on measurements made by other pieces of UE.

At block 535, navigation map may be accessed. The navigation map may determine available roads, bike paths, or other pathways that can be used by the vehicle (or pedestrian) possessing the on-board system.

At block 540, a navigational route from the current location to the received destination may be determined. The navigational route can be based on the cellular network slice coverage map, the determined or requested QoE needed for the one or more networked devices requiring communication, and the received cellular network priority or weighted priorities.

The determined navigational route may be output at block 545, such as to a vehicle navigation system or an output device such as a display screen and/or speaker. In some embodiments, the determined navigational route may be used by an autonomous or semiautonomous driving system to navigate a vehicle directly.

Figure 6:
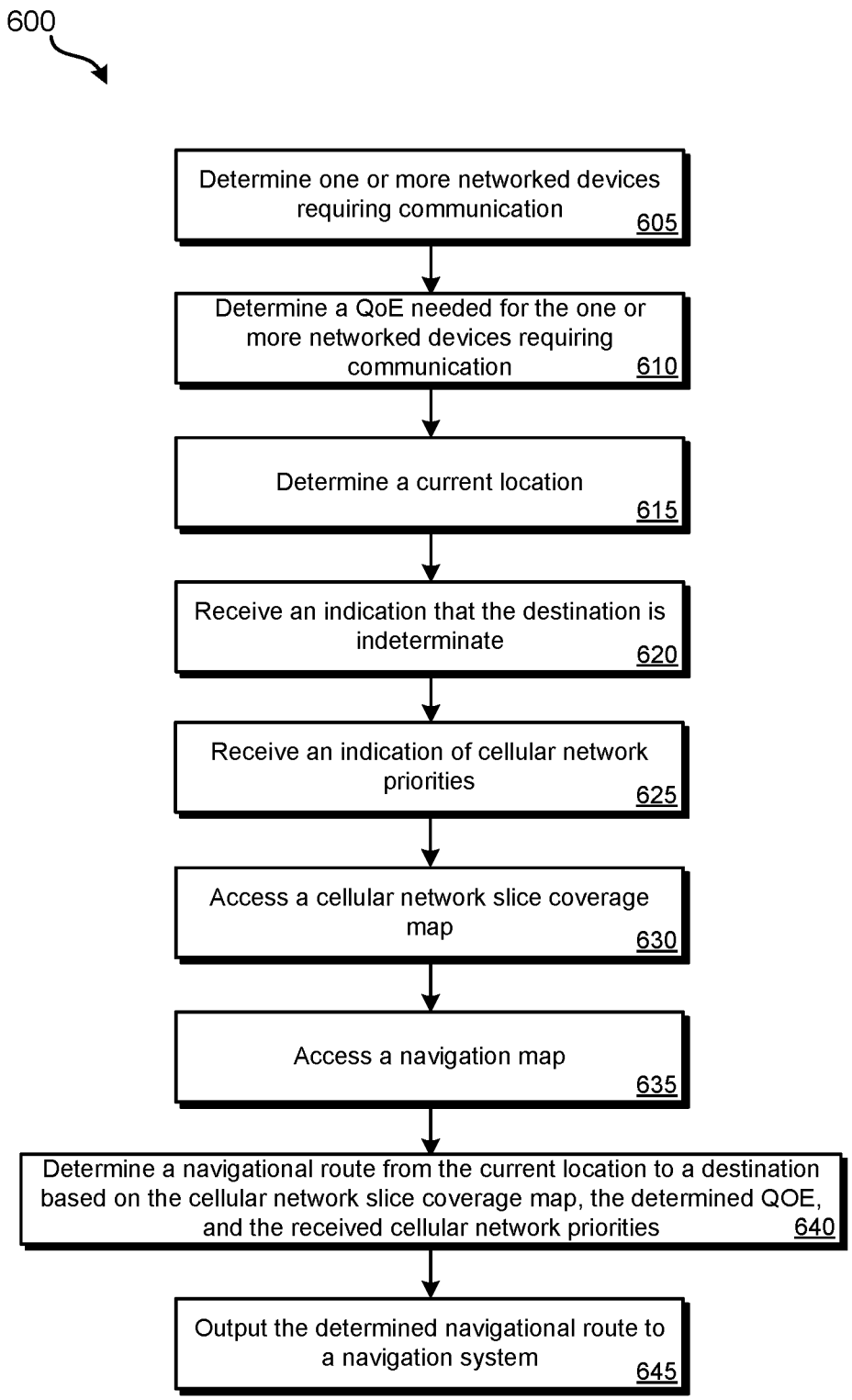
FIG. 6 illustrates an embodiment of a method for navigation to an indeterminate destination based on characteristics of the map of coverage areas of network slices over a geographic region.

FIG. 6 illustrates an embodiment of a method 600 for navigation to an indeterminate destination based on characteristics of the map of coverage areas of network slices over a geographic region. Method 600 may be performed using system 400 of FIG. 4 or an alternate embodiment thereof. At block 605, initial determination of one or more networked devices that require communication via a cellular network may be determined. The determination may be made by an on-board system, such as system 410. The determination may involve input from a user indicating networked devices that are required to be used during travel. In some embodiments, a predefined list of networked devices is specified that are assumed to be needed during travel. Additionally or alternatively, networked devices that are currently being used or are expected to be used may transmit data to the on-board system indicating such use. If a particular telemedicine application is to be used, a user may specify the telemedicine networked device or application. In some embodiments, a further indication of particular QoS parameters needed or a QoE level needed to be realized may be predefined, specified by the user, or indicated by the networked device itself.

At block 610, a QoE level needed for the one or more determined networked devices requiring communication may be determined. This can involve aggregating expected average data throughput rates, needed latency, etc. in order to determine the particular needs of the networked devices in aggregate. Block 610 may be performed by the on-board system or may be determined by a remote server system that is in communication with the on-board system. If only one particular networked device is being used, block 610 may not be needed.

At block 615, a current location of the on-board system may be determined. Such a determination may be made based on user input, such as an address or an absolute location determination being made using a GNSS sensor of the on-board system, such as a GPS sensor. At block 620, an indication of that the destination is indeterminate may be received. Therefore, the particular destination is not important as long as the destination allows a sufficient QoE to be met by the cellular network (or multiple cellular networks).

At block 625, an indication of a cellular network priority may be received or accessed by the on-board system. Cellular network priority may indicate whether travel time, overall QoE level, continuity of cellular network coverage, or expense of access to the cellular network (or multiple cellular networks) is preferred to be optimized for the navigation route. In some embodiments, a weighting of multiple cellular network priorities may be provided by the user or predefined.

At block 630, a cellular network slice coverage map may be accessed. The map may contain similar information to map 100 of FIG. 1. That is, the map may define geographic coverage areas of particular network slices of one or more cellular networks. The particular QoS metrics or QoE level expected to be experienced for a network slice (or average network performance characteristics) may be mapped to a particular geographic region. Since a network slice involves particular network resources being reserved for a particular end user or entity, the QoE experienced by the on-board system can be expected to match the QoE level set in an agreement for access to the network slice. The particular geographic region may have previously been determined based on measurements made by other pieces of UE.

At block 635, navigation map may be accessed. The navigation map may determine available roads, bike paths, or other pathways that can be used by the vehicle (or pedestrian) possessing the on-board system.

At block 640, a navigational route from the current location to a determined destination to be used as the indeterminate destination may be determined. The navigational route can be based on the cellular network slice coverage map, the determined or requested QoE needed for the one or more networked devices requiring communication, and the received cellular network priority or weighted priorities. Similarly, the indeterminate destination may represent the closest location, possibly with a distance buffer for error, where the desired or needed QoE can be realized.

The determined navigational route may be output at block 645, such as to a vehicle navigation system or an output device such as a display screen and/or speaker. In some embodiments, the determined navigational route may be used by an autonomous or semiautonomous driving system to navigate a vehicle directly.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for navigation performed based on characteristics of a cellular network, the method comprising:
    determining, by an on-board management system, a quality of experience (QoE) level required for a wireless service to be performed for a networked device;
    determining, by the on-board management system, a current location and a destination;
    receiving, by the on-board management system, a wireless network route priority, wherein the wireless network route priority is based on:
        assigning a first weight to a first priority;
        assigning a second weight to a second priority, and
        assigning a third weight to a third priority, wherein:
            the first priority, the second priority, and the third priority are selected from a group of priorities; and
            the first weight, the second weight, and the third weight differ from each other;
    accessing a wireless network coverage map, wherein:
        the wireless network coverage map maps cellular network slices to which the on-board management system has authorized access and a plurality of network performance characteristics for the cellular network across a geographic region;
    determining a route from the current location to the destination based on the wireless network coverage map, the determined QoE, and the wireless network route priority; and
    outputting, by the on-board management system, the determined route.

2. The method of claim 1, wherein the group of priorities comprises: an expense priority, a least-time priority, and performance priority.

3. The method of claim 1, wherein the plurality of network performance characteristics comprises: a packet loss rate; latency; and bandwidth.

4. The method of claim 1, wherein the wireless network coverage map maps cellular network slices which the on-board management system is authorized to access.

5. The method of claim 1, further comprising: determining the destination based on the wireless service to be performed for the networked device.

6. The method of claim 1, wherein determining the QoE level required is based on the QoE level required for a plurality of networked devices.

7. The method of claim 6, wherein the on-board management system is installed as part of an ambulance.

8. The method of claim 1, wherein the wireless network coverage map maps the plurality of network performance characteristics across the geographic region for multiple cellular networks.

9. The method for navigation performed based on characteristics of the cellular network of claim 1, wherein the on-board management system is integrated as part of a public safety vehicle and the networked device is a telemedicine device for providing medical care to a patient.

10. The method for navigation performed based on characteristics of the cellular network of claim 1, wherein the cellular network is a 5G New Radio (NR) cellular network.

11. A system for navigation performed based on characteristics of a cellular network, the system comprising:
    an on-board management system, installed on a vehicle, comprising:
        a global navigation satellite system (GNSS) component;
        a user input component;
        a cellular network interface; and
        a processing system, comprising one or more processors, where the processing system is configured to:
            determine a quality of experience (QoE) level required for a wireless service to be performed for a networked device;

determine a current location using data from the GNSS component and a destination;
receive a wireless network route priority, wherein:
the wireless network route priority is based on:
a first weight being assigned to a first priority;
a second weight being assigned to a second priority, and
a third weight being assigned to a third priority, wherein:
the first priority, the second priority, and the third priority are selected from a group of priorities; and
the first weight, the second weight, and the third weight differ from each other;
access a wireless network slice coverage map, wherein:
the wireless network slice coverage map maps cellular network slices to which the on-board management system has authorized access and a plurality of network performance characteristics for the cellular network across a geographic region;
determine a route from the current location to the destination based on the wireless network slice coverage map, the determined QoE, and the wireless network route priority; and
output the determined route.

12. The system of claim 11, wherein the group of priorities comprises: an expense priority, a least-time priority, and performance priority.

13. The system of claim 11, wherein the plurality of network performance characteristics comprises: a packet loss rate; latency; and bandwidth.

14. The system of claim 11, wherein the wireless network coverage map maps cellular network slices which the on-board management system is authorized to access.

15. The system of claim 11, wherein the processing system is further configured to determine the destination based on the wireless service to be performed for the networked device.

16. The system of claim 11, wherein the processing system being configured to determine the QoE level required is based on the QoE level required for a plurality of networked devices over a period of time.

17. The system of claim 11, further comprising a cloud-based server system that communicates with the on-board management system.

18. The system of claim 11, further comprising a public safety vehicle, wherein the on-board management system is integrated as part of the public safety vehicle and the networked device is a telemedicine device for providing medical care to a patient.

19. The system of claim 18, wherein the public safety vehicle is an ambulance.

20. The system of claim 11, wherein the cellular network is a 5G New Radio (NR) cellular network.

* * * * *